(12) United States Patent
Tanaka et al.

(10) Patent No.: US 7,818,973 B2
(45) Date of Patent: *Oct. 26, 2010

(54) AIR-CONDITIONING SYSTEM AND METHOD OF INSTALLING ENERGY RECOVERY APPARATUS

(75) Inventors: Yuji Tanaka, Narashino (JP); Yukihiro Fujita, Narashino (JP); Eiji Koyama, Funabashi (JP); Kouich Satou, Chiba (JP)

(73) Assignee: Hitachi Industrial Equipment Systems Co., Ltd., Chiba (JP)

( * ) Notice: Subject to any disclaimer, the term of this patent is extended or adjusted under 35 U.S.C. 154(b) by 186 days.

This patent is subject to a terminal disclaimer.

(21) Appl. No.: 11/900,477

(22) Filed: Sep. 11, 2007

(65) Prior Publication Data

US 2008/0022699 A1    Jan. 31, 2008

Related U.S. Application Data

(63) Continuation of application No. 10/808,625, filed on Mar. 24, 2004, now Pat. No. 7,296,429.

(30) Foreign Application Priority Data

May 14, 2003    (JP)    ............................. 2003-136161

(51) Int. Cl.
  F25D 17/02    (2006.01)
  F25D 17/00    (2006.01)
  F25B 27/00    (2006.01)
(52) U.S. Cl. .................... 62/238.6; 62/185; 165/902
(58) Field of Classification Search ................ 62/238.7, 62/238.4, 238.6, 185; 165/902; 60/641.2, 60/641.6
See application file for complete search history.

(56) References Cited

U.S. PATENT DOCUMENTS

| 4,352,025 | A |   | 9/1982 | Troyen |
| 5,497,615 | A | * | 3/1996 | Noe et al. ................ 60/39.511 |
| 6,698,223 | B2 | * | 3/2004 | Satoh et al. ............... 62/238.7 |
| 2003/0131621 | A1 | * | 7/2003 | Satoh et al. ............... 62/238.7 |

FOREIGN PATENT DOCUMENTS

| JP | 51-036748 A | 3/1976 |
| JP | 51-140350 A | 12/1976 |
| JP | 63-297949 A | 12/1988 |

* cited by examiner

*Primary Examiner*—Chen-Wen Jiang
(74) *Attorney, Agent, or Firm*—Townsend and Townsend and Crew LLP

(57) ABSTRACT

There is provided an energy recovery apparatus capable of recovering a hydraulic energy in a regenerative air-conditioning system including a pressure sustaining valve and capable of coping with a discharge change caused by variation in air-conditioning load, the air-conditioning system being capable of carrying out normal operation even in a case where the energy recovery apparatus fails. The energy recovery apparatus is configured so as to feed water from a water tank to air-conditioning loads such as a heat source or a fan coil at a higher place through a feed pipe line by a pump and to lead the water passed through the air-conditioning loads into the water tank via a return pipe line including the pressure sustaining valve, a branch pipe line is disposed so as to branch into the water tank from the return pipe line in upstream of the pressure sustaining valve, and the energy recovery apparatus is connected in to the branch pipe line.

13 Claims, 6 Drawing Sheets

CENTRIFUGAL FORCE $rw^2$ ⟶

AIR-CONDITIONING SYSTEM AND METHOD OF INSTALLING ENERGY RECOVERY APPARATUS

CROSS-REFERENCE TO RELATED APPLICATION(S)

This is a continuation of U.S. patent application Ser. No. 10/808,625, filed Mar. 24, 2004 now U.S. Pat. No. 7,296,429, which application claims priority from Japan Patent Application No. 2003-136161, filed May 14, 2003, the entire disclosure of which is incorporated herein by reference.

BACKGROUND OF THE INVENTION

The present invention relates to an air-conditioning system, particularly to an air-conditioning system in which an energy recovery apparatus is installed. Furthermore, the present invention also relates to a method of installing the energy recovery apparatus.

In a general form of a regenerative air-conditioning system, as shown in FIG. 9, from a thermal storage tank 6, water is fed to air-conditioning loads (A. H.) 9 such as a heat source machine or a fan coil via a pump 7, and water passed through the air-conditioning load 9 is led into the thermal storage tank 6 via a return pipe line 10. This is referred to as an open return process. The open return process is used in a case where an actual pump head is less than 20 m. When the air-conditioning system comes to a stop, water supply from a feed pump is stopped. However, in the open return process, water freely falls in the vertically rising return pipe line, that is, water drops under the gravity. A siphon effect by the dropping water causes the pressure in the pipe line to be negative so as to induce cavitation noise, vibration, and corrosion result. To eliminate these problems, a vacuum breaker 12a is installed to prevent the pressure in the piping from becoming negative. An energy recovery apparatus for an open return type regenerative air-conditioning system is described in JP-A-63-297949. A structure is shown in FIG. 11.

From the thermal storage tank 6 arranged in a basement of a building, water is fed to a heat source machine 24 on a roof of the building via the pump 7, and is fed to air-conditioning loads 29 on respective floors via another pump 27. The water fed to the air-conditioning loads 29 passes through a return pipe line 22 so as to return to the heat storage tank 6 installed in the basement. Energy recovery apparatuses 100 are installed on a third floor and the first basement in the return pipe line.

On the other hand, in recent years, even with the construction of high-rise buildings, regenerative air-conditioning systems have also been used in buildings with about five to ten floors. In this case, since the actual pump head exceeds 20 m, there is a problem that large vibration and noise are caused upon dropping of water in the open return system. To prevent occurrence of such problems, pressure sustaining valve 11 is disposed in the return pipe line 10 before the water is returned to the heat storage tank 6 in order to prevent the water from dropping. This is a full water return process which is configured in general as shown in FIG. 10.

The pressure sustaining valve 11 is one of pressure regulating valves. When a pressure larger than a set pressure is applied, the valve opens so as to allow water to pass there through. On the other hand, when the air-conditioning system comes to a stop and the water supply from the feed pump 7 is interrupted, the valve is rapidly closed in order to prevent water from dropping. From the time when the water supply from the feed pump 7 is interrupted to the time when the pressure sustaining valve 11 closes (three to ten seconds), water in the vertically rising return pipe line 10 freely falls, that is, water is dropped under the gravity in the same manner as in the open return process. In order to prevent the pressure in the pipe line from becoming the negative pressure at this stage, a surge tank 13 is connected via a check valve 12b. Thus water is fed from the surge tank 13 until the pressure sustaining valve 11 is closed, and the pressure in the pipe line is prevented from becoming negative.

When the air-conditioning system comes to a stop the water supply from the feed pump 7, the pressure sustaining valve 11 has to prevent water in the return piping 10 from dropping. Therefore, the set pressure of the pressure sustaining valve 11 stored to be set to a value slightly larger than a pressure which is exerted to the valve when the valve is closed. The pressure exerted to the pressure sustaining valve 11 when the feed pump 7 resting is equal to a potential energy owned by water in the return piping 10, or a height to the water surface of the surge tank 13 from the pressure sustaining valve 11, that is, the actual pump head. In other words, the pressure sustaining valve 11 has a resistance corresponding to the actual pump head. That is, during the operation of the air-conditioning system, water is fed via the feed pump 7, the potential energy of water pumped up to a top part of the pipe line in the air-conditioning system by the feed pump 7 is consumed as the resistance of the pressure sustaining valve 11 when water passes through the pressure sustaining valve 11. Therefore, since no energy remains in return water downstream of the pressure sustaining valve 11, the energy recovery apparatus cannot be used.

On the other hand, should the energy recovery apparatus be connected, upstream of the pressure sustaining valve 11, the potential energy of the return water would not be absorbed by the energy recovery apparatus just upstream of the pressure sustaining valve 11, the water cannot flow overcoming the resistance of the pressure sustaining valve 11, and therefore the air-conditioning system cannot be operated normally.

Moreover, the power of the feed pump 7 has to be increased in order to operate the air-conditioning system in the state in which the energy recovery apparatus is connected, upstream of the water drop preventing valve 11, and accordingly, there would be raised a problem that energy saving cannot be achieved.

Furthermore, if the energy recovery apparatus is connected upstream of the pressure sustaining valve 11, the pressure of the pressure sustaining valve could be set to be small, that is, the resistance of the water preventive valve 11 could be set to be small, and accordingly the consumption power of the feed pump 7 can be restrained from increasing. However, the actual pump head owned by the return water could not be maintained by the pressure sustaining valve 11 when the air-conditioning system comes to a stop, and there would be raised such a problem that water drops. It is to be noted that the pressure sustaining valve is installed in the air-conditioning system, in the basement or the like and it is difficult to remove the valve.

Additionally, if the energy recovery apparatus fails, a problem similar to such a problem that an obstruction is caused in the return pipe line occurs, and therefore the air-conditioning system cannot be operated normally.

BRIEF SUMMARY OF THE INVENTION

The present invention has been devised in view of the above-mentioned problems, and an object of the present invention is to provide a method of operating an energy recovery apparatus in an air-conditioning system so as to recover a unused hydraulic energy even in the regenerative air-conditioning system including a pressure sustaining valve and to accept variable discharge caused by fluctuation of an air-conditioning load. Further, according to the present invention there is provided an air-conditioning system which is capable of recovering an unused energy in a building, in which the air-conditioning system can be operated normally, even though the energy recovery apparatus fails. Further, another object of the present invention is to provide a method of installing an energy recovery apparatus in an air-conditioning system.

To the end, according to the present invention, there is provided an air-conditioning system comprising: a water tank such as a hot water storage tank from which water is fed to air-conditioning loads such as a heat source or a fan coil, the water passing through the air-conditioning load, then being guided into the water tank via a return pipe line, and passing through a pressure sustaining valve connected in the return pipe line so as to return to the water tank, wherein, a branch pipe line is connected to the water tank from the return pipe line, upstream of the pressure sustaining valve, and an energy recovery apparatus is connected in the branch pipe line. Accordingly, since the return water returns to the water tank through the branch pipe line, a potential energy owned by the return water is not wasted by the resistance of the pressure sustaining valve. Therefore, the energy recovery apparatus connected in the branch pipe line can recover the potential energy. Furthermore, even though the energy recovery apparatus fails so as to inevitably constitute an obstruction which decreases a discharge through the branch pipe line, the water can flow through the pressure sustaining valve in the return pipe line of the existing system, thereby it is possible to prevent the operation of the air-conditioning system from being influenced by the failure.

Moreover, according to the present invention, there is provided an air-conditioning system comprising a water tank from which water is fed to the air-conditioning loads such as the heat source or a fan coil via the pump, the water passing through the air-conditioning load, led into the water tank via the return pipe line, and the water returning to the water tank through a pressure sustaining valve connected in the return pipe line, wherein, a branch pipe line is connected to the water tank from the return pipe line, upstream of the pressure sustaining valve, an energy recovery apparatus is connected in the branch pipe line, and a control valve is connected in the branch pipe line downstream of the energy recovery apparatus. Accordingly, since the return water returns to the water tank through the branch pipe line, the potential energy owned by the return water is not wasted by the resistance of the pressure sustaining valve, and can be recovered by the energy recovery apparatus connected in the branch pipe line. The control valve can be closed to prevent the water from dropping from the branch pipe line even when the air-conditioning system comes to a stop.

Furthermore, according to the present invention, there is provided a method of operating an energy recovery apparatus in an air-conditioning system of water thermal storage type, including a water tank, water is fed from the water tank to the air-conditioning loads such as a heat source machine or a fan coil via the pump, the water having passed through air-conditioning loads being led into the water tank through a return pipe line, and the water returning to the water tank through a pressure sustaining valve disposed in the return piping. In the system, a branch pipe line is extended to the water tank from the return pipe line upstream of the pressure sustaining valve, and the energy recovery apparatus is connected in the branch pipe line. In the case of a change in discharge passing through the energy recovery apparatus, the operation of the energy recovery apparatus is controlled in such a manner that an inlet pressure of the energy recovery apparatus is within a predetermined rate range with respect to an inlet pressure of the energy recovery apparatus at a time when the energy recovery apparatus is operated at a rated discharge. Accordingly, the pressure in the return pipe line is appropriately kept, and it is therefore possible to prevent the pressure in the return pipe line from negative becoming and to prevent occurrence of cavity, noise, vibration and corrosion.

Additionally, according to the present invention there is provided an air-conditioning system comprising a water tank, water is fed from the water tank to air-conditioning loads such as the heat source machine or a fan coil via a pump, the water having passed through the air-conditioning loads being led into the water tank by a return pipe line, and the water returning to the water tank through the pressure sustaining valve disposed in the return pipe line. In this air-conditioning system of a hot water thermal storage type, a branch pipe line is extended to the water tank from the return pipe line upstream of the pressure sustaining valve, the energy recovery apparatus is connected in the branch pipe line, and the control valve is provided downstream of the energy recovery apparatus. In the case of a change in discharge passing through the energy recovery apparatus, the operation of the energy recovery apparatus and the control valve are adjusted in such a manner that the inlet pressure of the energy recovery apparatus falls within a predetermined rate range with respect to an inlet pressure of the energy recovery apparatus at the time when the energy recovery apparatus is operated at a rated discharge. Accordingly, the pressure in the return pipe line is appropriately kept during the operation of the air-conditioning system, and it is therefore possible to prevent pressure in the return pipe line from becoming negative and to present occurrence of cavity noise, vibration, and corrosion. When the air-conditioning system is stopped, the control valve is closed to prevent the water from being dropping through the return pipe line.

Moreover, the energy recovery apparatus according to the present invention comprises: a water wheel including a centrifugal impeller; a brushless permanent magnet synchronous generator; and a generator controller for controlling the generator. Therefore, a revolving speed of the generator is adjusted by the generator controller, the revolving speed of the water wheel directly connected to the generator can be adjusted. Therefore, the present invention can adapt the water wheel the change of the discharge passing through the water wheel with the use of characteristics of the water wheel including the centrifugal impeller, that is, such characteristics that the discharge passing through the water wheel is changed in accordance with the revolving speed thereof. This can prevent a pressure in the return pipe line from becoming negative and to prevent occurrence of cavity, noise, vibration and corrosion.

Furthermore, in the energy recovery apparatus according to the present invention, since a bore diameter of the pipe line downstream of the energy recovery apparatus is smaller than that on the upstream side of the energy recovery apparatus, the control valve connected in downstream side of the energy recovery apparatus can be small-sized. Thus, there can be provided an inexpensive energy recovery apparatus.

The present invention will be described in detail in the form of prepared embodiments.

Other objects, features and advantages of the invention will become apparent from the following description of the embodiments of the invention taken in conjunction with the accompanying drawings.

DETAILED DESCRIPTION OF THE INVENTION

Embodiments of the present invention will be described.

Figure 1:
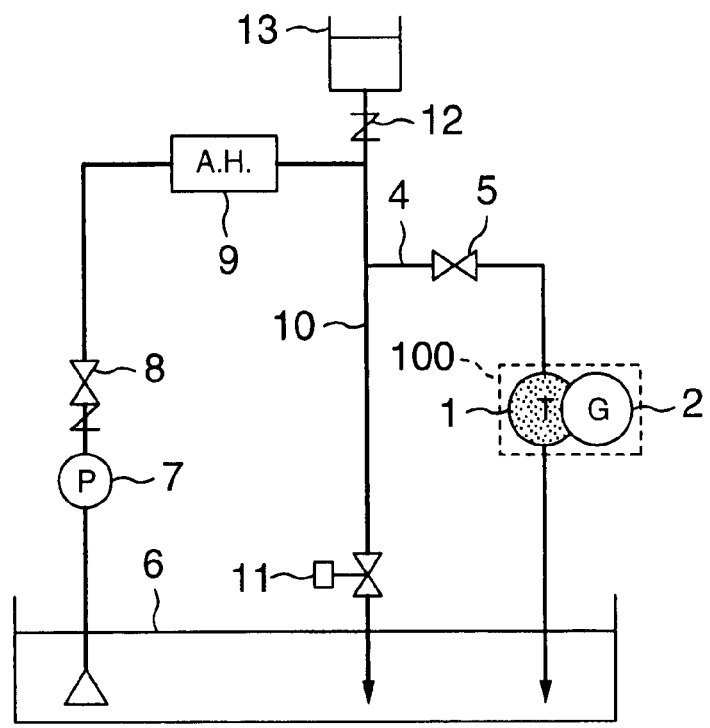
FIG. 1 is a view for explaining a configuration of an air-conditioning system in a first embodiment.

Explanation will be made of a first embodiment of the present invention. FIG. 1 shows a regenerating air-conditioning system to which the energy recovery apparatus according to the present embodiment is incorporated. A pipe line from a thermal storage tank 6 is connected to a feed pump 7, and a pipe line from the feed pump 7 is connected to an air-conditioning apparatus 9. A pipe line from the air-conditioning apparatus 9 is connected to a return pipe line 10. The return pipe line 10 is connected to a surge tank 13 via a check valve 12 at its upper end. A lower end of the return pipe line 10 is connected to the thermal storage tank 6. A pressure sustaining valve 11 is connected in the return pipe line 10 just upstream of the thermal storage tank, and is set to a set pressure so as to be equal to that in the case of no presence of an energy recovery apparatus. A branch pipe line 4 is connected to the return pipe line 10 upstream of the pressure sustaining valve 11, and is also connected to the thermal storage tank 6. A manual valve 5 is connected in the branch pipe line 4. A Francis turbine 1 including a centrifugal impeller is connected downstream of the manual valve 5, in the branch pipe line 4. The Francis turbine 1 is directly coupled to a brushless permanent magnet synchronous generator 2 so as to constitute an energy recovery apparatus 100.

The water is fed from the thermal storage tank 6 to the air-conditioning apparatus 9 located there above. The water which has exchanged heat with the air-conditioning apparatus 9 has a potential energy, and falls toward the thermal storage tank 6 through the return pipe line 10. The set pressure of the pressure sustaining valve 11 connected in the lower part of the return pipe line 10, that is, the resistance to water passing through the pressure sustaining valve 11 is set so as to be slightly higher than a pressure head corresponding to the potential energy so as to close the water drop preventing valve 11 when the air-conditioning system comes to a stop so as to stop the water supply from the feed pump. Therefore, the water in the return pipe line 10 does not pass through the pressure sustaining valve 11 having a large resistance, but flows into the branch pipe line 4 upstream of the pressure sustaining valve 11. Since the manual valve 5 disposed in the branch pipe line 4 is set to a full open state, there is no resistance by the manual valve 5. Therefore, the energy recovery apparatus 100 connected downstream of the manual valve 5 can recover a substantially all point of the potential energy owned by the return water.

Moreover, the energy recovery apparatus 100 is disposed in the branch pipe line 4, and the pressure sustaining valve 11 is connected in a return pipe line 10. Therefore, even when the energy recovery apparatus 100 fails due to any cause so as to increase, the resistance to water at the time of the passage through the turbine 1, the water passes through the pressure sustaining valve 11 so as to return to the thermal storage tank 6. Therefore, no trouble is caused in the air-conditioning system. Furthermore, the manual valve 5 is disposed between the return piping 10 and the energy recovery apparatus 100. Therefore, even in maintenance of the energy recovery apparatus 100, the manual valve 5 is closed so that the water passes through the pressure sustaining valve 11 and returns to the thermal storage tank 6, and accordingly no trouble is caused in the air-conditioning system.

Figure 2:
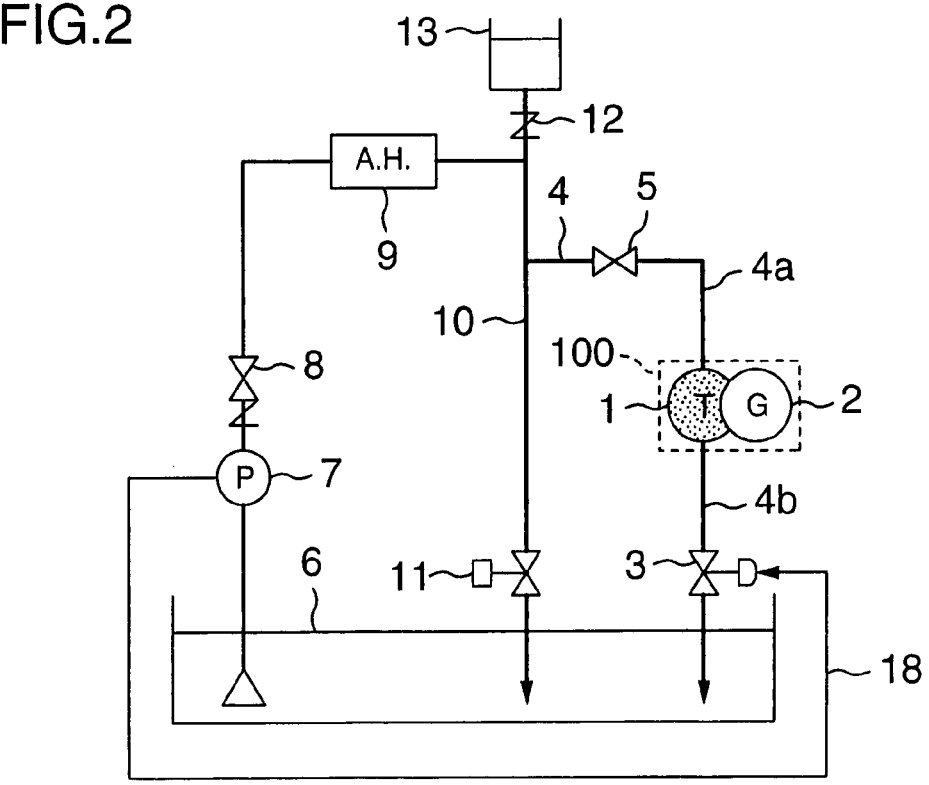
FIG. 2 is a view for explaining a configuration of an air-conditioning system in a second embodiment.

A second embodiment will be described. FIG. 2 shows a regenerative air-conditioning system in which the energy recovery apparatus in this embodiment is incorporated. The pipe line from the thermal storage tank 6 is connected to the feed pump 7, and the pipe line from the feed pump 7 is connected to the air-conditioning apparatus 9. The pipe line from the air-conditioning apparatus 9 is connected to the return pipe line 10. The return piping 10 is connected to the surge tank 13 via the check valve 12 in its upper end. The lower end of the return pipe line 10 is connected to the thermal storage tank 6. The pressure sustaining valve 11 is connected in the return pipe line 10 direct upstream of the thermal storage tank, and is set to a pressure equal to that in such a case that no energy recovery apparatus is incorporated. A branch pipe line 4 is extended from the upstream side of the pressure sustaining valve 11 and is connected to the thermal storage tank 6. The branch pipe line 4 is connected therein with a manual valve 5. A Francis turbine 1 including a centrifugal impeller is provided, downstream of the manual valve 5, in the branch pipe line 4. The Francis turbine 1 is directly coupled to the brushless permanent magnet synchronous generator 2 so as to constitute the energy recovery apparatus 100. A bore diameter of a pipe line 4b downstream of the energy recovery apparatus 100 is smaller than that of a pipe line 4a upstream thereof. Furthermore, a control valve 3 is connected in the pipe line 4b downstream of the energy recovery apparatus 100.

The bore diameter of the pipe line 4b downstream of the energy recovery apparatus 100 is small, and therefore a small-sized control valve 3 can be used. This can reduce installation costs. While the air-conditioning system is operating, the control valve 3 is fully opened, and therefore there is no resistance to water through the control valve 3 at the time of passage thereof. Since the pipe line 4b downstream of the energy recovery apparatus 100 has a small bore diameter, a velocity of water flowing through the pipe line 4b increases, and a piping resistance per unit length increases. However, since the pipe line 4b is disposed just upstream of the thermal storage tank, a pipe line is short, and therefore the resistance of the pipe line 4b is small. Therefore, the energy recovery apparatus 100 is capable of recovering a substantially all part of the potential energy owned by the return water. Furthermore, when the air-conditioning system comes to a stop, the control valve 3 is closed by a stop command signal 18 for the feed pump, and therefore the water in the return pipe line 10 does not fall through the branch pipe line.

Figure 3:
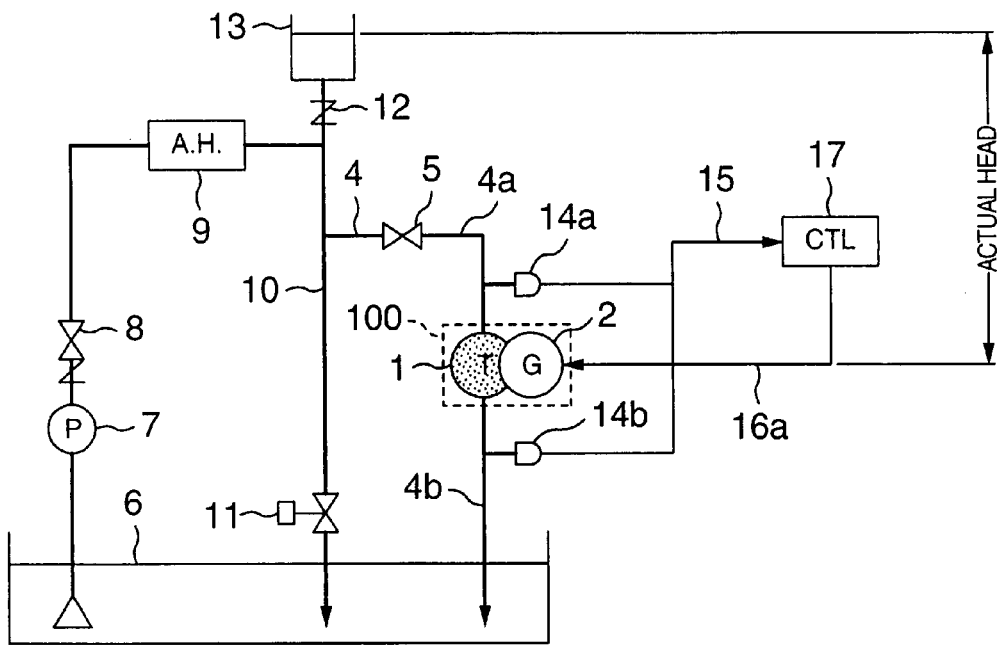
FIG. 3 is a view for explaining a configuration of an air-conditioning system of a third embodiment.

A third embodiment will be described. FIG. 3 shows a regenerative air-conditioning system in which an energy recovery apparatus in this embodiment is incorporated. A pipe line from a thermal storage tank 6 is connected to a feed pump 7, and a pipe line from the feed pump 7 is connected to the air-conditioning apparatus 9. The pipe line from the air-conditioning apparatus 9 is connected to a return pipe line 10. The return pipe line 10 is connected to a surge tank 13 via a check valve 12 at the upper end of the return pipe line. The lower end of the return pipe line 10 is connected to a thermal storage tank 6. The pressure sustaining valve 11 is connected in a return pipe line 10 just upstream of the return to the thermal storage tank. A branch pipe line 4 is connected to the return pipe line 4 upstream of the pressure sustaining valve 11 and is connected to the thermal storage tank 6. The branch pipe line 4 is provided with a manual valve 5. A Francis turbine 1 including the centrifugal impeller is connected, downstream of a manual valve 5, in the branch pipe line 4. The Francis turbine 1 is directly coupled to a brushless permanent magnet synchronous generator 2 so as to constitute a energy recovery apparatus 100. A pressure sensor 14a is provided upstream of the Francis turbine 1, and a pressure sensor 14b is provided downstream thereof. A signal 15 from the pressure sensor 14 is delivered to a generator controller 17. The generator controller 17 delivers a generator control signal 16a for controlling the generator 2.

Figure 5:
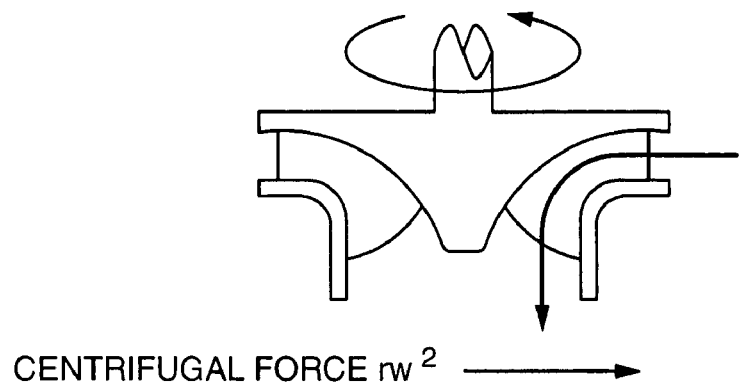
FIG. 5 is a view for explaining a water flow situation of an impeller used in the fourth embodiment.
Figure 6:
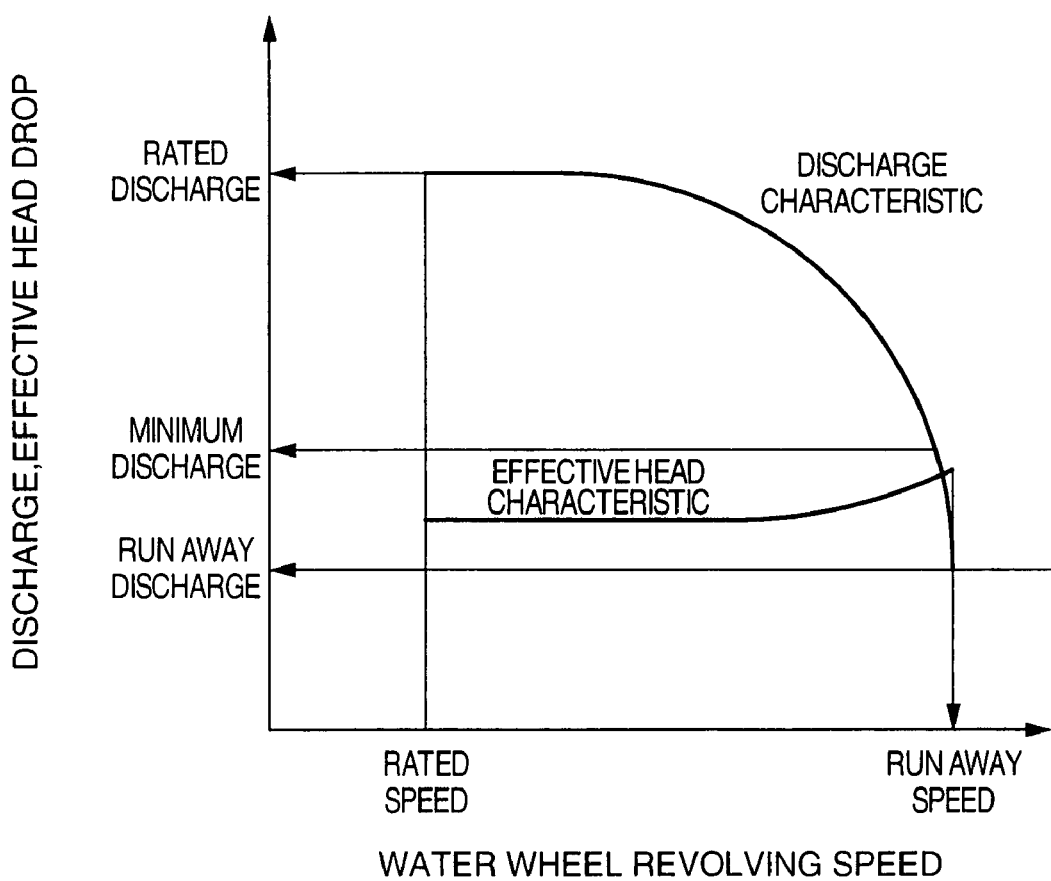
FIG. 6 is a view for explaining a characteristic of a Francis water wheel generator used in the fourth embodiment.

The lower discharge of the air-conditioning system, the smaller discharge of water passing through the water wheel 1 also, signals 15 from the upstream pressure sensor 14a and the downstream pressure sensor 14b change. The generator controller 17 transmits the generator control signal 16a to the generator 2 so as to raise a revolving speed of the generator in response to changes of the signals 15. When the revolving speed of the water wheel 1 directly connected to the generator 2 rises due to an increase in the revolving speed of the generator 2, the impeller exhibits a flow pattern as shown in FIG. 5. Streams of water passing through the water wheel are directed inwards from the outside of the impeller by a radically inward force by a pressure energy. At this time, since the impeller rotates, the water streams also rotate together with the impeller. A centrifugal acceleration $r\omega^2$ acts on the rotating water streams due to an angular speed $\omega$ of the impeller. That is, a radically outward force by the centrifugal acceleration and a radically inward force by the pressure energy act on the water streams in the impeller, the forces being competitive to each other. Therefore, when the revolving speed of the impeller increases, the radically outward force by the centrifugal acceleration becomes relatively large, and the discharge of water passing through the water wheel decreases. As a result the characteristics of the Francis water wheel examined through experiments is shown in FIG. 6. With an increase in the revolving speed of the water wheel, the flow rate decreases while an effective head drop becomes substantially constant. The revolving speed of the generator 2 is controlled by the generator controller 17 in this manner, and accordingly the flow rate can be adjusted while the effective head drop of the water wheel remains to be constant. Therefore, even when the discharge is changed due to variation in an air-conditioning load, the system can be operated in such a manner that the pressure in the water wheel inlet is held within a predetermined rate range with respect to a water wheel inlet pressure at the time of the operation of the water wheel at a rated discharge. Therefore, the pressure in the return pipe line 10 can be appropriately kept. A range in which the discharge can be controlled is available up to an discharge of runaway speed. However, since the output power rapidly drops around the discharge of runaway speed an actual control range remains at a minimum discharge. Since the minimum discharge depends on the shape of the impeller, and is correlated with a specific speed, a discharge control range can be studied in advance.

Figure 4:
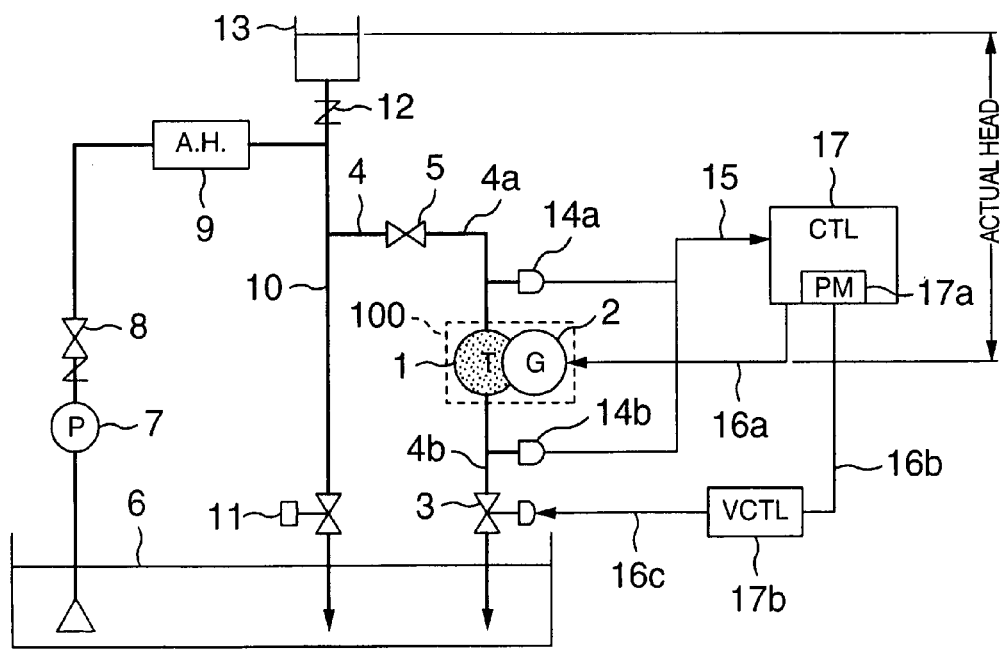
FIG. 4 is a view for explaining a configuration of an air-conditioning system of a fourth embodiment.
Figure 7:
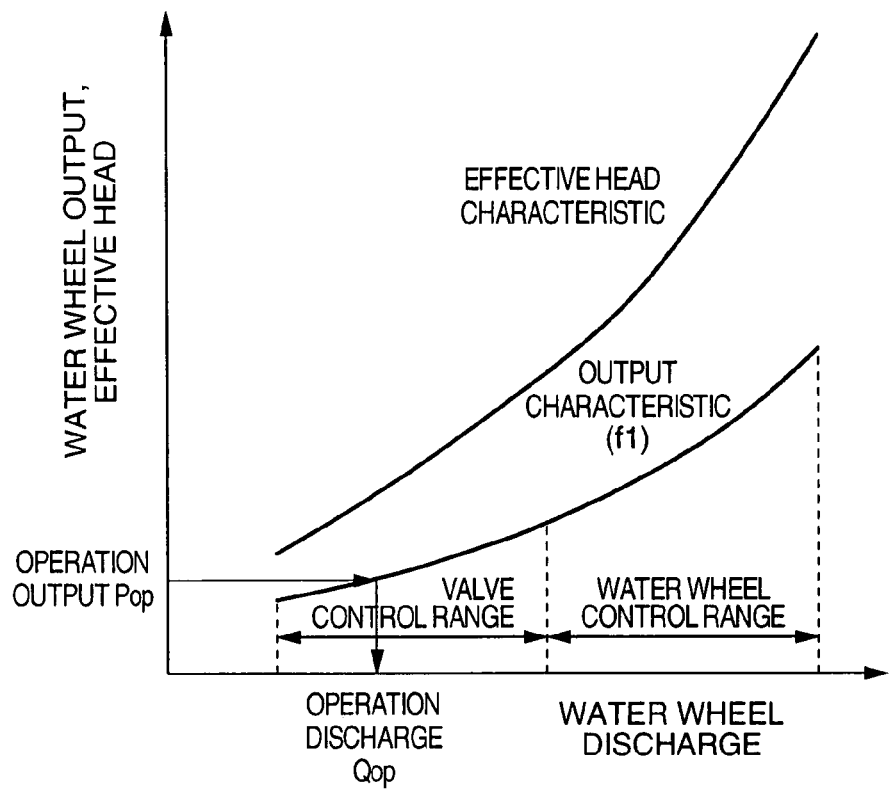
FIG. 7 is a view for explaining a characteristic of the Francis water wheel generator used in the fourth embodiment.
Figure 8:
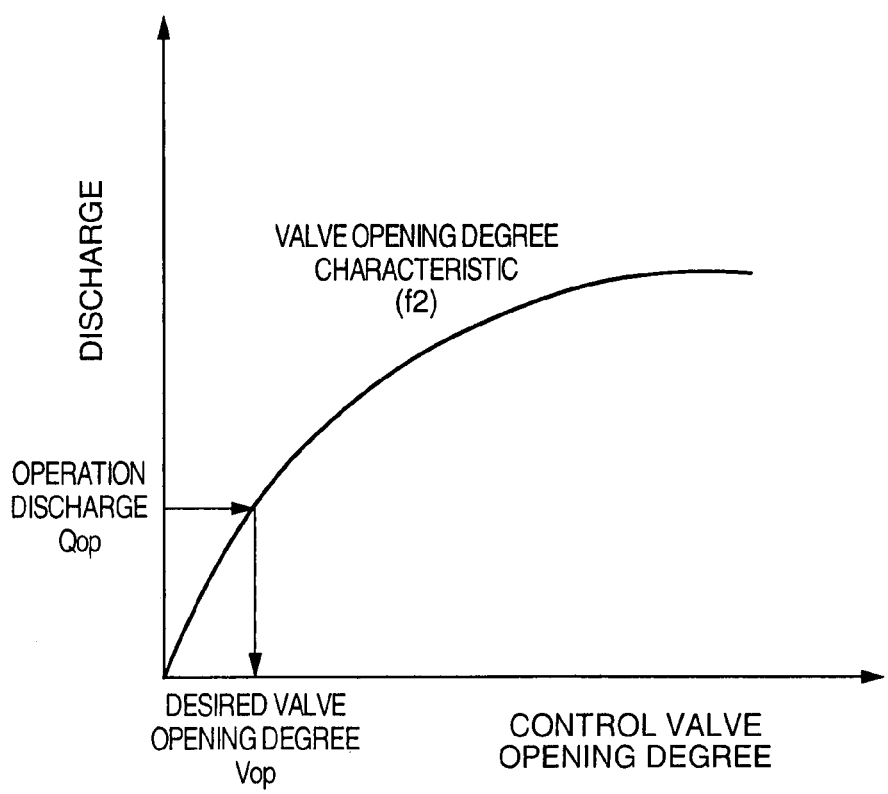
FIG. 8 is a view for explaining a characteristic of a control valve used in the fourth embodiment.
Figure 9:
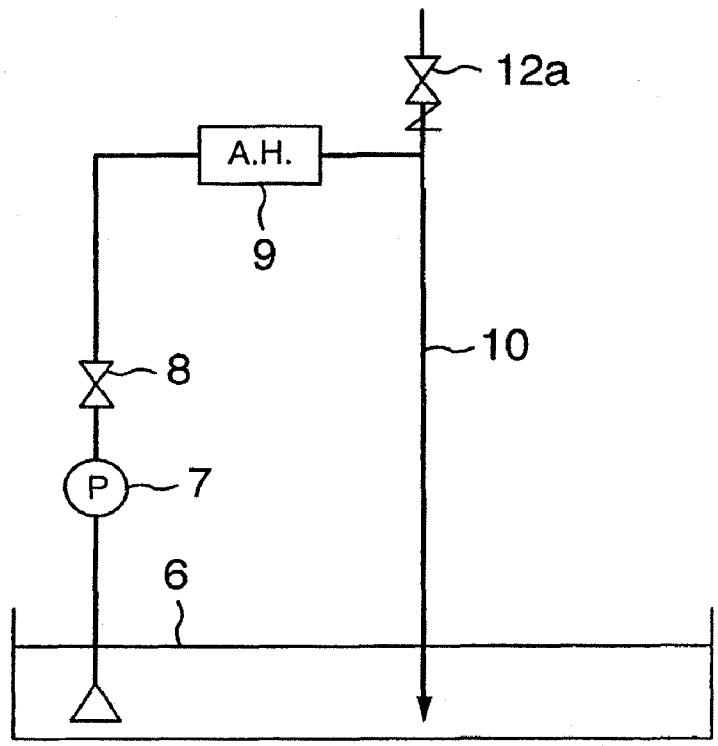
FIG. 9 is a view for explaining a configuration of an open return type regenerative air-conditioning system.
Figure 10:
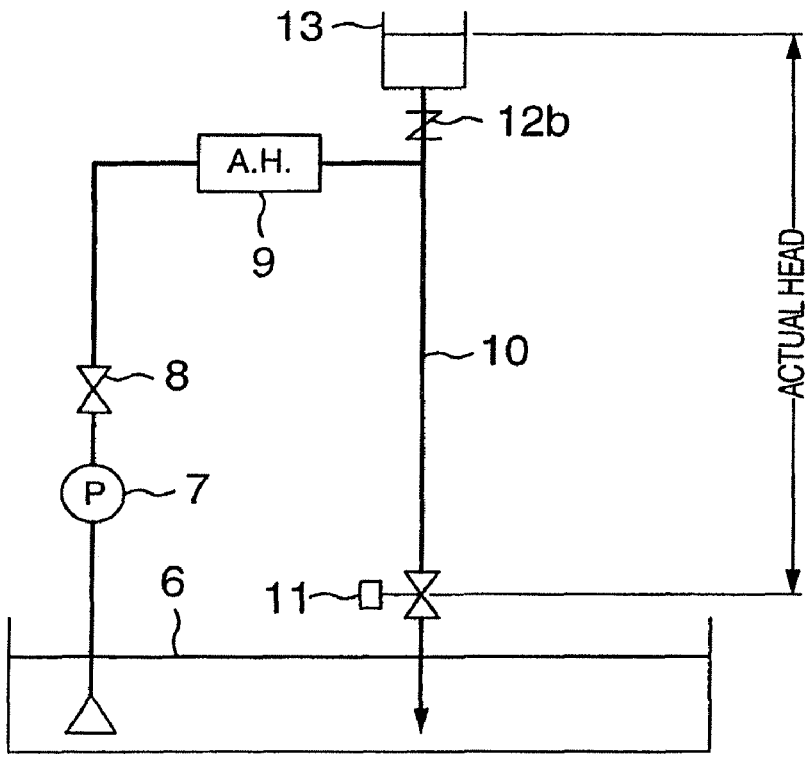
FIG. 10 is a view for explaining a configuration of a full return type regenerative air-conditioning system.
Figure 11:
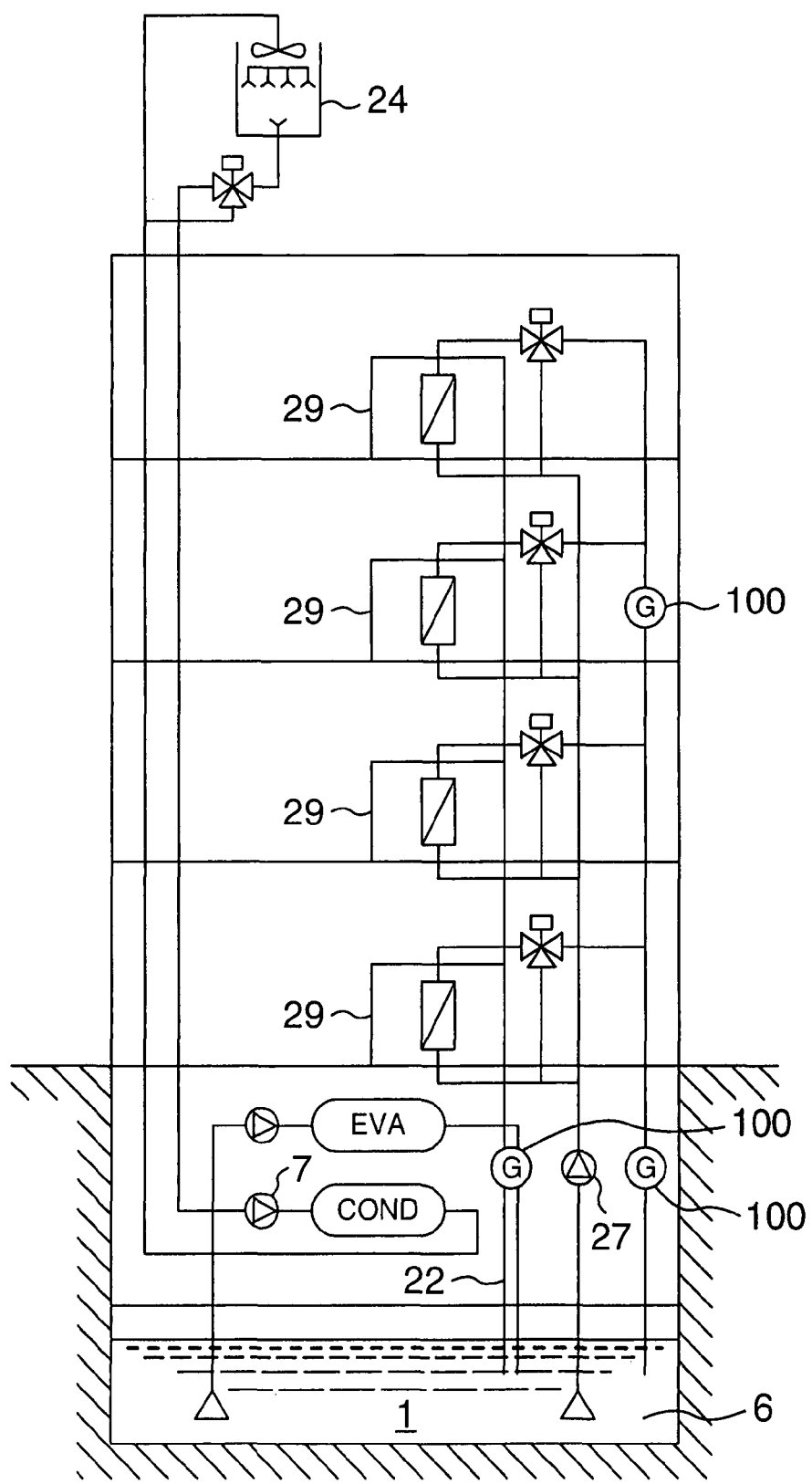
FIG. 11 is a view for explaining a configuration of a conventional energy recovery apparatus.

A fourth embodiment will be described. FIG. 4 shows a water thermal storage type air-conditioning system to which an energy recovery apparatus according to the present embodiment is incorporated. A pipe line from a thermal storage tank 6 is connected to the feed pump 7, and a pipe line from the feed pump 7 is connected to an air-conditioning apparatus 9. A pipe line from the air-conditioning apparatus 9 is connected to a return pipe line 10. The return pipe line 10 is connected to a surge tank 13 via a check valve 12 at an upper end thereof. A lower end of the return piping 10 is connected to a thermal storage tank 6. The pressure sustaining valve 11 is connected in the return pipe line 10 just upstream of the thermal storage tank. A branch pipe line 4 is extended from the upstream side of the pressure sustaining valve 11 and is connected to the thermal storage tank 6. The branch pipe line 4 is provided therein with a manual valve 5. A Francis turbine 1 including a centrifugal impeller is connected downstream of the manual valve 5, in the branch pipe line 4. The Francis turbine 1 is directly coupled to a brushless permanent magnet synchronous generator 2, and a generator controller 17 for controlling the revolving speed of the generator 2 is connected to the generator 2 so to constitute an energy recovery apparatus 100. A pressure sensor 14a is provided upstream of the Francis turbine 1, and a pressure sensor 14b is provided the downstream thereof. A signals 15 from the pressure sensors 14a, 14b are delivered to the generator controller 17. The generator controller 17 delivers a generator control signal 16a so as to control the generator 2. The bore diameter of the pipe line 4b downstream of the energy recovery apparatus 100 is smaller than that of the pipe line 4a upstream thereof. Furthermore, a control valve 3 is connected in the pipe line 4b downstream of the energy recovery apparatus 100. A power measuring device 17a is built in the generator controller 17 to measure always an output power of the generator. Moreover, when a measured value is smaller than a set value recorded beforehand in the generator controller 17, a measurement result is delivered as an analog signal 16b to a control valve controller 17b. An output characteristic with respect to the discharge of the Francis turbine 1 shown in FIG. 7 is recorded as a function f1 in the control valve controller 17b. A discharge characteristic with respect to a valve opening degree shown in FIG. 8 is recorded as a function f2. An analog signal 16b which is an output power is delivered into the control valve controller 17b, and an operation discharge Qop corresponding to an operation output power Pop is calculated by the function f1. Next, a desired valve opening degree Vop is calculated from the operation discharge Qop by the function f2. Moreover, the valve opening of the control valve 3 is adjusted to Vop. Therefore, even though the discharge changes due to variation in the air-conditioning load so that the discharge becomes below a water wheel control range in which the discharge can be set by adjusting the revolving speed of the water wheel generator shown in FIG. 7, by ceasing the revolving speed adjustment of the water wheel generator while adjusting the valve opening degree of the control valve 3 the generator can be operated in such a manner that the pressure in the water wheel inlet is held within a predetermined rate range with respect to the water wheel inlet pressure during the operation of the water wheel at a rated discharge. Therefore, the pressure in the return pipe line 10 can be appropriately kept. Therefore, the discharge control range can be enlarged.

Although explanation has been hereinabove made such that the output characteristic with respect to the discharge shown in FIG. 7 is recorded as the function f1, the present invention should not be limited to this matter. It goes without saying that even if an effective head drop characteristic with respect to the discharge is recorded as the function f1, a similar function can be obtained. The control valve controller 17b may also be constituted integrally with the generator controller 17.

It is noted that the pressure sustaining valve may be provided in the return pipe line around a terminal end of the return pipe line, or at an inflow point of the return pipe line into the thermal storage tank. Therefore, the pressure sustaining valve can be appropriately disposed, depending upon a kind of a system. However, even in this case, the above-described embodiments based on the present invention can be carried out.

As described above, according to the embodiments of the present invention, in the regenerative air-conditioning system including the pressure sustaining valve, the branch pipe line is extended to the thermal storage tank from the return pipe line upstream of the pressure sustaining valve, and the energy recovery apparatus is connected in the branch pipe line. Therefore, the potential energy owned by the water in the return piping is not wasted through the resistance of the pressure sustaining valve, and the energy recovery apparatus is capable of recovering the potential energy owned by the water in the return piping. It is noted that in the present invention a brine solution is also usable in addition to water.

Moreover, according to the embodiments of the present invention, since the control valve is disposed downstream of the energy recovery apparatus connected in the branch pipe line, the water in the return pipe line can be prevented from dropping through the branch pipe line in a case where the air-conditioning system comes to a stop.

Furthermore, according to the embodiments of the present invention, the energy recovery apparatus comprises: the water wheel generator including the centrifugal impeller; the control valve disposed downstream of the water wheel generator; the generator controller including the power measuring device; the pressure sensors at the inlet and outlet of the water wheel generator; and the control valve controller which can perform recording of the function indicating the water wheel output characteristic with respect to the flow rate and the function indicating the valve opening characteristic with respect to the flow rate and which can calculate the valve opening degree from an output power of the water wheel. Therefore, even when the discharge of the air-conditioning system decreases, by adjusting the revolving speed of the water wheel generator until the output power of the water wheel reaches the set value recorded beforehand in the generator controller, and even if the water wheel output is smaller than the set value recorded beforehand in the generator controller, by adjusting the valve opening degree of the control valve, the apparatus can be operated in such a manner that the pressure of the inlet of the energy recovery apparatus is held within the predetermined rate range with respect to the water wheel inlet pressure during the operation of the water wheel at a rated discharge. Therefore, the pressure in the return pipe line 10 can be appropriately kept. Therefore, even though the discharge of the air-conditioning system decreases, it is possible to prevent the pressure in the return pipe line becoming negative and to prevent occurrence of cavity noise, vibration and corrosion.

Since the present invention provides the method of operating the energy recovery apparatus even in the air-conditioning system, capable of recovering the hydraulic energy even in the air-conditioning system of the regenerative type including the pressure sustaining valve and capable of coping with the discharge change caused by variation in air-conditioning load, thereby it is possible to provide an air-conditioning system capable of recovering unused energy in a building and capable of carrying out normal operation even though the energy recovery apparatus fails.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An energy recovery apparatus installed in an air-conditioning system comprising a water tank, a feed pipe line for feeding water from the water tank to air-conditioning loads, a return pipe line for leading water which has passed through the air-conditioning loads into the water tank, and a pressure sustaining valve disposed in the return pipe line, the apparatus characterized by:
   a branch pipe line connected to the return pipe line, the branch pipe line is configured to branch into the water tank from the return pipe line upstream of the pressure sustaining valve, wherein the pressure sustaining valve is installed into the branch pipe line; and
   an energy recovery apparatus being connected in the branch pipe line, wherein the pressure sustaining valve is configured to selectively open and close depending on pressure in the return pipe line.

2. An energy recovery apparatus according to claim 1, wherein the energy recovery apparatus comprises: an operation control device for such a manner that an inlet pressure falls within a predetermined rate range with respect to an inlet pressure during operation at a rated discharge, when a discharge passing through the energy-recovery apparatus changes.

3. An energy recovery apparatus according to claim 1 or 2, wherein a bore diameter of a pipeline downstream of the energy recovery apparatus is smaller than the upstream thereof.

4. An energy recovery apparatus according to claim 3, when the energy recovery apparatus comprises: a water wheel including a centrifugal impeller; a brushless permanent magnet synchronous generator; and a generator controller for controlling the generator.

5. An energy recovery apparatus according to claim 4, wherein a control valve is disposed in the return piping on the downstream side of the energy recovery apparatus.

6. An energy recovery apparatus according to claim 5, wherein the water wheel comprises pressure sensors for measuring inlet and outlet pressures upstream and downstream thereof so as to transmit output signals to the generator controller, the generator controller being capable of controlling a revolving speed of the generator incorporated to the water wheel based on the output signals, and delivering a control signal to the generator, and power measuring device for measuring an output power of the generator to deliver a measurement result to a control valve controller, the control valve controller being capable of specifying a valve opening degree of the control valve based on the measurement result so as to deliver a valve opening signal to the control valve.

7. An energy recovery apparatus according to claim 6, wherein the revolving speed of the generator incorporated to the water wheel is increased in response to a decrease in the discharge, and the increasing of the revolving speed of the generator incorporated to the water wheel is caused so as to reduce the valve opening degree of the control valve by the control valve controller in association with the generator controller, when an output power of a water wheel of an effective head drop thereof is smaller than a set value recorded in the generator controller.

8. An energy recovery apparatus in an air-conditioning system comprising: a water tank; a feed pipe line for feeding water to air-conditioning loads via a pump; a return pipe line for leading the water which has passed through the air-conditioning loads into the water tank; and a pressure sustaining valve disposed in the return pipe line, the apparatus comprising:
   a branch pipe line connected to the return pipe line upstream of the pressure sustaining valves, wherein the branch pipe is configured to branch into the water tank; and
   wherein the energy recovery apparatus is connected in the branch pipe line.

9. An energy recovery apparatus according to claim 8, wherein the bore diameter of a pipe line downstream of the energy recovery apparatus is smaller than that upstream thereof.

10. An energy recovery apparatus according to claim 8 or 9, wherein the return piping has a control valve and the control valve is closed in case that the air-conditioning system is stopped.

11. An energy recovery apparatus according to claim 10, wherein the energy recovery apparatus comprises: a water wheel including a centrifugal impeller; a brushless permanent magnet synchronous generator; and a generator controller for controlling the generator.

12. An energy recovery apparatus according to claim 11, wherein the water wheel comprises pressure sensors for measuring inlet and outlet pressures upstream and downstream thereof so as to transmit output signals to the generator controller, the generator controller being capable of controlling a revolving speed of the generator incorporated to the water wheel based on the output signals, and delivering a control signal to the generator, and a power measuring device for measuring an output power of the generator to deliver a measurement result to a control valve controller, the control valve controller being capable of specifying a valve opening degree of the control valve based on the measurement result so as to deliver a valve opening signal to the control valve.

13. An energy recovery apparatus according to claim 12, wherein the revolving speed of the generator incorporated to the water wheel is increased in response to a decrease in the discharge, and the increasing of the revolving speed of the generator incorporated to the water wheel is caused so as to reduce the valve opening degree of the control valve by the control valve controller in association with the generator controller, when an output power of a water wheel or an effective head drop thereof is smaller than a set value recorded in the generator controller.

* * * * *